(12) United States Patent
Seo

(10) Patent No.: US 8,286,213 B2
(45) Date of Patent: Oct. 9, 2012

(54) HTTP BASED VIDEO STREAMING APPARATUS AND METHOD IN MOBILE COMMUNICATION SYSTEM

(75) Inventor: Kwang-Deok Seo, Gyeonggi-Di (KR)

(73) Assignee: LG Electronics Inc., Seoul (KR)

( * ) Notice: Subject to any disclaimer, the term of this patent is extended or adjusted under 35 U.S.C. 154(b) by 1892 days.

(21) Appl. No.: 10/678,068

(22) Filed: Oct. 6, 2003

(65) Prior Publication Data

US 2004/0231004 A1    Nov. 18, 2004

(30) Foreign Application Priority Data

May 13, 2003    (KR) .................. 10-2003-0030270

(51) Int. Cl.
*H04N 7/173*    (2011.01)
(52) U.S. Cl. ............ 725/90; 725/91; 725/93; 725/114; 725/116
(58) Field of Classification Search ............ 725/86–104; 709/231
See application file for complete search history.

(56) References Cited

U.S. PATENT DOCUMENTS

| | | | | |
|---|---|---|---|---|
| 5,822,540 | A * | 10/1998 | Caldara et al. ................ | 709/236 |
| 6,047,101 | A * | 4/2000 | Kawamura et al. ........... | 386/343 |
| 6,104,441 | A * | 8/2000 | Wee et al. ................ | 375/240.15 |
| 6,118,759 | A * | 9/2000 | Ohyoshi et al. ............... | 370/229 |
| 6,192,398 | B1 * | 2/2001 | Hunt ............................. | 709/213 |
| 6,314,466 | B1 * | 11/2001 | Agarwal et al. .............. | 709/231 |
| 6,483,875 | B1 * | 11/2002 | Hasebe et al. ............ | 375/240.15 |
| 6,738,980 | B2 * | 5/2004 | Lin et al. ......................... | 725/88 |
| 6,956,600 | B1 * | 10/2005 | Gaylord ..................... | 348/14.08 |
| 7,051,262 | B2 * | 5/2006 | Wang et al. .................... | 714/758 |
| 7,743,400 | B2 * | 6/2010 | Kurauchi ...................... | 725/114 |

FOREIGN PATENT DOCUMENTS

JP    2003114845 A *  4/2003
WO    WO 03/028293 A1 *  4/2003

* cited by examiner

*Primary Examiner* — Brian Pendleton
*Assistant Examiner* — Jonathan V Lewis
(74) *Attorney, Agent, or Firm* — KED & Associates, LLP

(57) ABSTRACT

An HTTP based video streaming apparatus and method of a mobile communication system is disclosed. A memory, such as a storing disk, stores content files received from a server of a transmitting party, a random access searching unit searches the random access point in the memory and transmits a content file request message to the transmitting server if the random access point does not exist in the memory, and a display unit displays the files from the random access point. Therefore, HTTP streaming service from a random point required by a user can be provided when the streaming has begun, and the random access function can be supported by even if the part required by the user has not yet been transmitted to receiving party.

7 Claims, 4 Drawing Sheets

HTTP BASED VIDEO STREAMING APPARATUS AND METHOD IN MOBILE COMMUNICATION SYSTEM

BACKGROUND OF THE INVENTION

1. Field of the Invention

The present invention relates to an Hypertext Transfer Protocol (HTTP) based video streaming apparatus and method, and particularly, to an HTTP-based video streaming apparatus and method that supports random access in a mobile communication system providing video streaming service based on HTTP.

2. Background of the Related Art

Generally, video on demand (VOD) in a mobile communication system is a service that receives content information desired by a user from a server and plays the information on a mobile communication terminal. VOD can be realized in an HTTP-based download method and an RTP-based streaming method.

The HTTP-based download method plays the content information after downloading all of the content information in the terminal to provide high quality multimedia service. However, the HTTP based method requires that the user wait a period of time in order to completely download the contents. Moreover, the terminal requires a large amount of storage space for the fully downloaded content.

The Real Time Protocol (RTP) based streaming method, on the other hand, plays the received contents after buffering at least a portion of the contents for a predetermined initial delay time. The user is thus able to receive and view the contents in real-time. However, the quality of the presentation of the content is limited due to the limitation in transmission bandwidth, and some of the data may be damaged due to the transmission environment.

An HTTP-based streaming method combines advantages of both the HTTP based download method and the RTP based streaming method.

FIG. 1 is a drawing illustrating a related art HTTP based streaming apparatus. The apparatus includes a storing disk 10 for storing content files transmitted from a server (not shown), and a display unit 12 for displaying the content files stored in the storing disk 10 by decoding them using a decoder 11 so that the user can view the contents. The apparatus further includes a random access searching unit 13 for searching a random access point requested by the user within the content files stored in the storing disk 10.

The random access searching unit 13 identifies whether there is a random access point required by the user in the content files stored in the storing disk 10, and decodes and plays from that point if the point is present in the content file.

The solid lines illustrated between the storing disk 10 and the decoder 11, between the decoder 11 and the display unit 12, and between the random access searching unit 13 and the storing disk 10 represent the signal flow for general HTTP streaming service, and the dotted lines represent a signal flow generated when random access is required by the user.

An operation of the related art HTTP-based streaming apparatus will be described as follows. First, transmission control protocol (TCP) packets, which are transmitted from a transmitting server, are stored in the storing disk 10 through a buffer by the receiving party. The storing disk 10 stores the received packets for a predetermined period of time in file form. The files stored for the predetermined delay time are then decoded and played on the display unit 12 so that the user can view them. At that time, the storing disk 10 continuously receives and stores the packets from the transmitting party server while the stored files are displayed.

When the user requires random access, the random access searching unit 13 searches the files stored in the storing disk 10 to determine whether the file stored in the storing disk 10 include the random access point. If the random access point is present in the file, the file is decoded and displayed on the display unit 12 from that point. On the contrary, if the required random access point is not in the files, the random access function is not supported.

The related art HTTP based streaming method has various problems. For example, as with the HTTP based download method in such viewpoints, port and data channel for transmitting the contents are set using HTTP, and TCP is used for transmitting the actual content packets. However, the HTTP based streaming method decodes and plays the received TCP packets after buffering them for a predetermined delay time, differently from the HTTP based download method in which the content files are played after transmitting the entire file from the server of the transmitting party to the receiving party.

Accordingly, the HTTP based streaming method has a disadvantage that the utility of the random access function is reduced to less than that of the RTP based streaming method.

Additionally, the related art HTTP based streaming method is only able to perform the random access function for the content file stored in the storing disk after being transmitted to the receiving party. That is, in order to identify certain contents by the user, the certain content file must already be stored in the storing disk of the receiving party.

Therefore, according to the related art HTTP based streaming method, even if the user wants to receive information from a certain multimedia content point when the streaming has started, the transmission from that point cannot be made.

Also, according to the related art HTTP based streaming method, if the random access requirement occurs during the streaming service, the random access function for the above requirement cannot be supported if the corresponding contents are not stored in the storing disk of the receiving party.

The above references are incorporated by reference herein where appropriate for appropriate teachings of additional or alternative details, features and/or technical background.

SUMMARY OF THE INVENTION

An object of the present invention is to solve at least the above problems and/or disadvantages and to provide at least the advantages described hereinafter.

Another object of the present invention is to provide an HTTP based video streaming apparatus and method which can support a random access function as in an RTP based streaming method in a mobile terminal.

Another object of the present invention is to provide an HTTP based video streaming apparatus and method which can support a random access function from a random access point required by a user even at an initial stage of streaming.

Another object of the present invention is to provide an HTTP based video streaming apparatus and method which can support a random access function even when a part required to be accessed randomly by the user has not been transmitted to memory.

To achieve at least these objects in whole or in parts, there is provided an HTTP based video streaming apparatus in a mobile communication system, including a storing disk for storing content files received from a server at a transmitting party, a random access searching unit for searching a random access point in the storing disk and transmitting a content file request message to the transmitting server if the random access point does not exist in the storing disk, and a display unit for playing the files from that random access point stored in the storing disk.

To further achieve at least the above objects, in whole or in parts, there is provided an HTTP based video streaming method in a mobile communication system, including a step of requiring content file when a random access point required by the user is not in the storing disk, a step of receiving data stream which is re-configured based on the random access point, and a step of playing the received content files.

To further achieve at least the above objects, in whole or in parts, there is provided an HTTP based video streaming method, including a step of receiving a random access requirement by a server on transmitting party from a random access searching unit, a step of searching the random access point in content files stored in the server, a step of re-configuring data stream according to a screen type of the random access point, and a coincidence of the random access point and the data transmission starting point, and a step of transmitting the re-configured data stream.

To further achieve at least the above objects, in whole or in parts, there is provided an HTTP based video streaming method of a random access method of data stream including a plurality of headers having a plurality of media data samples and time information for the respective media data samples, including a step of searching an I-frame which is similar to the random access point required by the user, a step of configuring a media data sample as pointing the I-frame as data transmission starting point, and a step of changing header information of the media data sample.

To further achieve at least the above objects, in whole or in parts, there is provided an HTTP based video streaming method in a random access method of a data stream including a plurality of headers having a plurality of media data samples and time information for the media data samples, including a step of searching an I-frame which is most similar to the random access point required by the user, a step of converting a P-frame which is next to the I-frame into the I-frame through calculating, a step of configuring a media data sample as pointing the I-frame as data transmission starting point after converting the random access point, that is, the P-frame into the I-frame, and a step of changing header information of the media data sample.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

According to a preferred embodiment of the HTTP based video streaming apparatus and method in a mobile communication system of the present invention, a random access function can be supported even in circumstances that cannot be supported by the related art HTTP based streaming method. For example, a random access function can be supported when the streaming has begun and when that data required by the random access has not yet been stored in memory.

Figure 1:
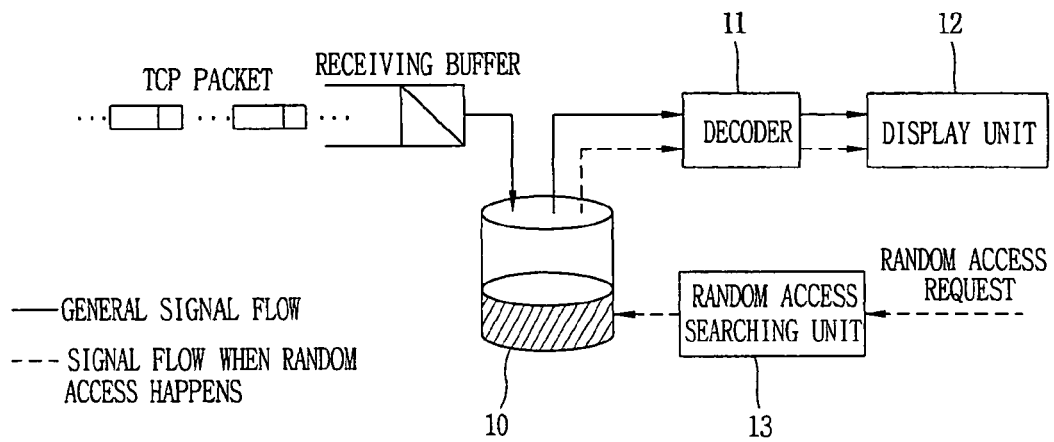
FIG. 1 is a diagram showing a configuration of an HTTP based streaming apparatus according to the related art.
Figure 2:
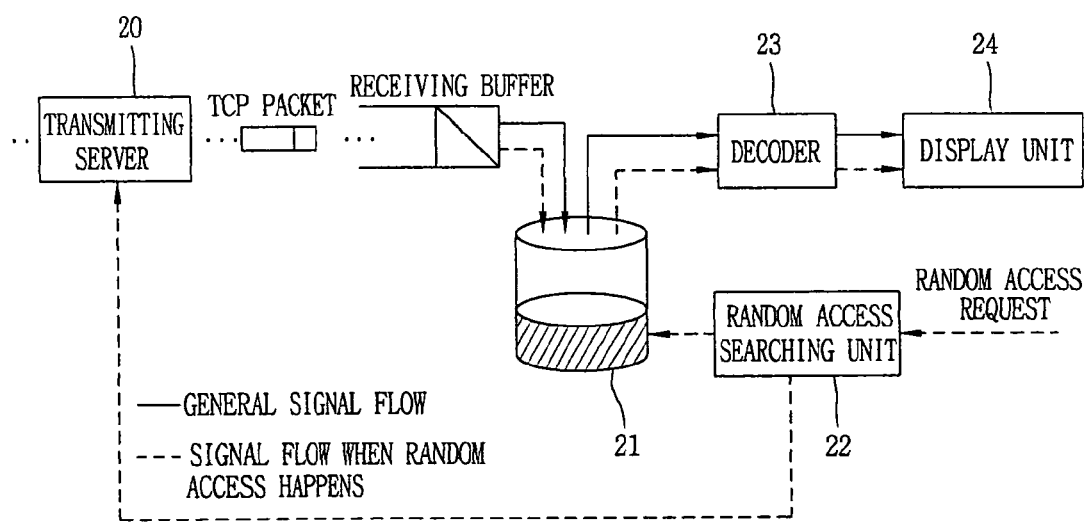
FIG. 2 is a diagram showing a configuration of an HTTP based video streaming apparatus in a mobile communication system according to a preferred embodiment of the present invention.

FIG. 2 is a drawing illustrating an HTTP based video streaming apparatus in a mobile communication system according to a preferred embodiment of the present invention. As shown therein, the HTTP based video streaming apparatus preferably includes a memory 21, such as a storage disk, for storing content files, or portions thereof, received from a transmitting server 20. It preferably further includes a random access searching unit 22 for searching the random access point required by a user in the content file stored in memory 21, and at the same time requesting the content file from the transmitting server 20 if the corresponding requested point does not exist in the stored content files. The apparatus preferably further includes a decoder 23 for decoding the files from the random access point required by the user and a display unit 24 for displaying the decoded files.

The random access searching unit 22 supports the random access function so that the streaming can be begun from the random access point required by the user when the streaming has begun, and also transmits a content file request message to the transmitting server 20 if the random access point required by the user has not yet been stored in the memory 21.

In FIG. 2, solid lines represent the signal flow for a general HTTP streaming service, and dotted lines represent the signal flow generated only when the random access is required by the user.

A configuration of the content file stored in the transmitting server 20 should preferably be changed for preferred embodiments of the HTTP based video streaming apparatus, so as to support the random access function when the random access is required after the streaming has begun but where the data required by the random access has not yet been stored in the memory 21. Specifically, the content file stored in the transmitting server 20 is preferably an MP4 (MPEG-4) file.

Figure 3:
FIG. 3 is a diagram showing a data stream configuration of a general MP4 file.

FIG. 3 is a drawing illustrating a configuration of a data stream for a general MP4 file. The MP4 file can preferably be divided into a header part and a media data part including audio and video data.

The header part includes information about audio and video areas as well as various other information, such as the timing information for the media data sample. Therefore, when the content of the media data is temporally increased, a size of the header part is also proportionally increased.

In addition, in order to read the contents of the media data included in the MP4 file, the information included in the header part is required. Therefore, when the size of the header part is increased, the waiting time for watching the contents in the HTTP based strearing service is also increased.

In order to solve the above problem, the MP4 file format preferably includes an optional function, referred to as a file fragmentation, which divides one file into discontinuous plural segments.

Figure 4:
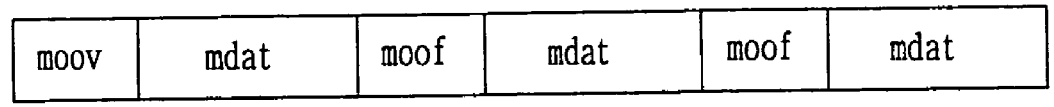
FIG. 4 is a diagram showing a data stream configuration of an MP4 file applied by file fragmentation process.

FIG. 4 is a drawing illustrating a data stream configuration of an MP4 file that has been modified by file fragmentation. The file preferably includes a plurality of media samples formed by dividing media data into N segments, and headers allocated to respective media data samples.

The headers preferably include a representative header (moov), having information corresponding commonly to the media data samples and timing information of the corresponding media data sample, and segment headers (moof) allocated to respective media data samples, except for the first media data sample, having time information of the corresponding media data sample.

The representative header is essential information since it includes the meta information of the MP4 file. Therefore, when the first media data sample is discarded and the next media data sample becomes the first media data sample, the segment header of the next sample receives the information of the representative header and is converted into the representative header.

For example, as shown in FIG. 4, when using the file fragmentation method, the size of the representative header is reduced by fragmenting one media data into several samples, and the segment header, which includes the time information for the divided media data sample, is additionally made. Moreover, when the file fragmentation method is used, it is easy to search the part corresponding to the random access request when the request is made.

The media data includes the video data. The video data preferably comprises either an I-frame, which includes entire screen information, or a P-frame, which only includes information for movement prediction. The P-frame has less data than the I-frame, and therefore the video data consists mostly of P-frames. Additionally, the I-frame is located with a predetermined interval in order to prevent a defect from being generated on the video screen due to accumulating errors.

The HTTP based video streaming method in a mobile communication system according to the preferred embodiment of the present invention thus supports the random access function by using the file fragmentation method of the MP4 file stored in the transmitting server 20 and the I-frame disposed with a predetermined interval on the video bit stream.

Figure 5:
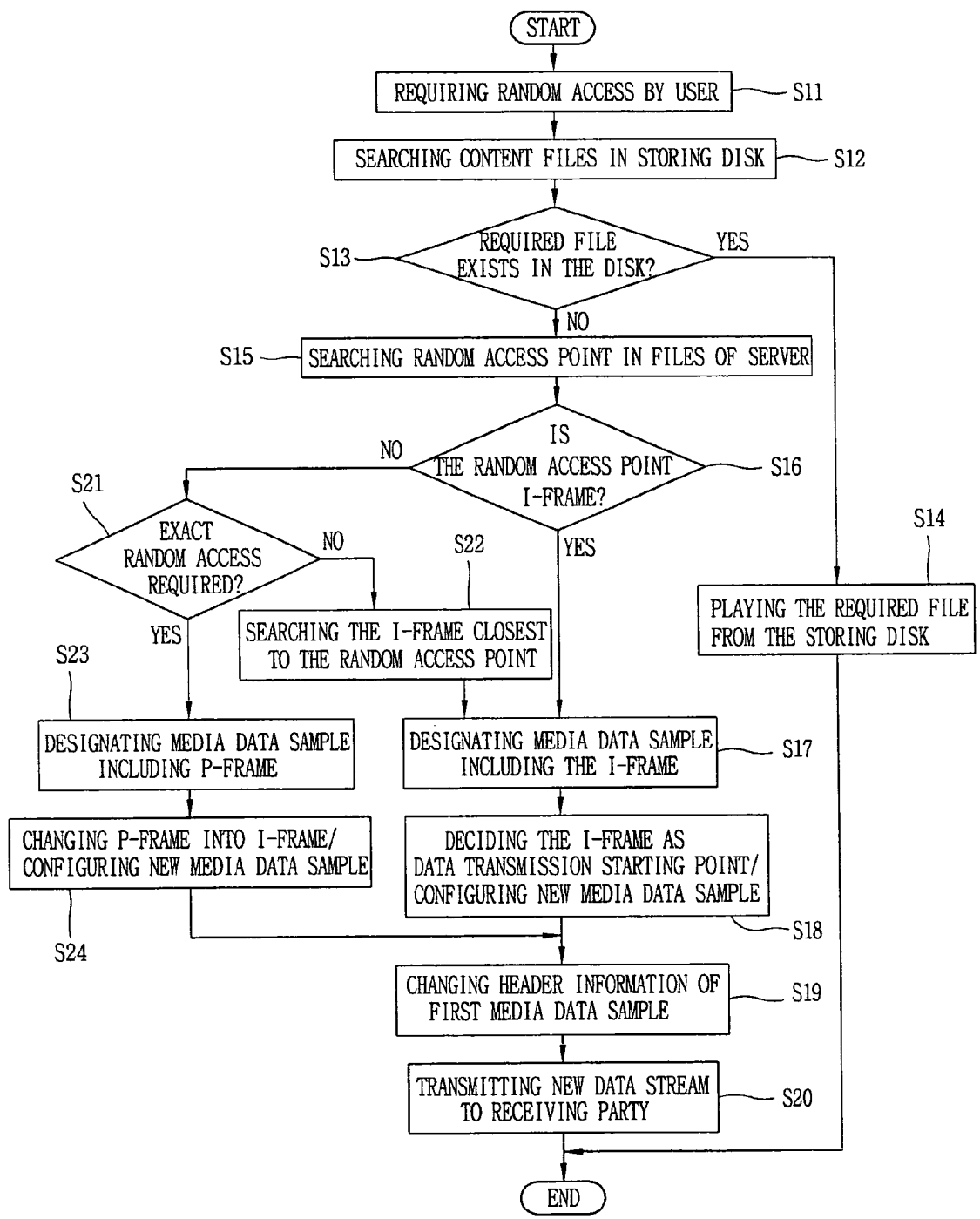
FIG. 5 is a flow chart illustrating an HTTP based video streaming method in a mobile communication system according to a preferred embodiment of the present invention.
Figure 6:
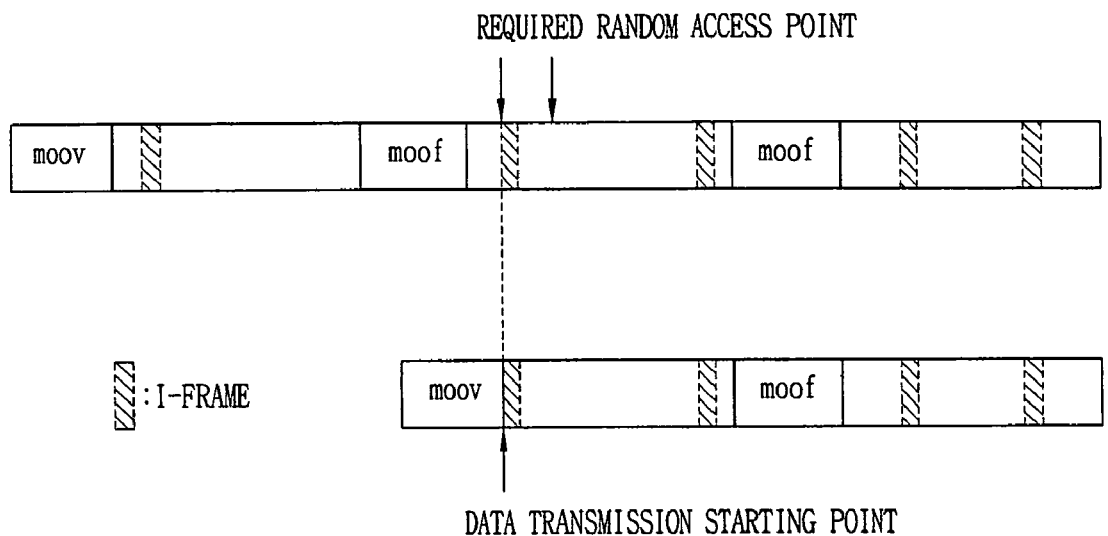
FIG. 6 is a diagram showing a first embodiment of the present invention applied by the HTTP based video streaming method in a mobile communication system.
Figure 7:
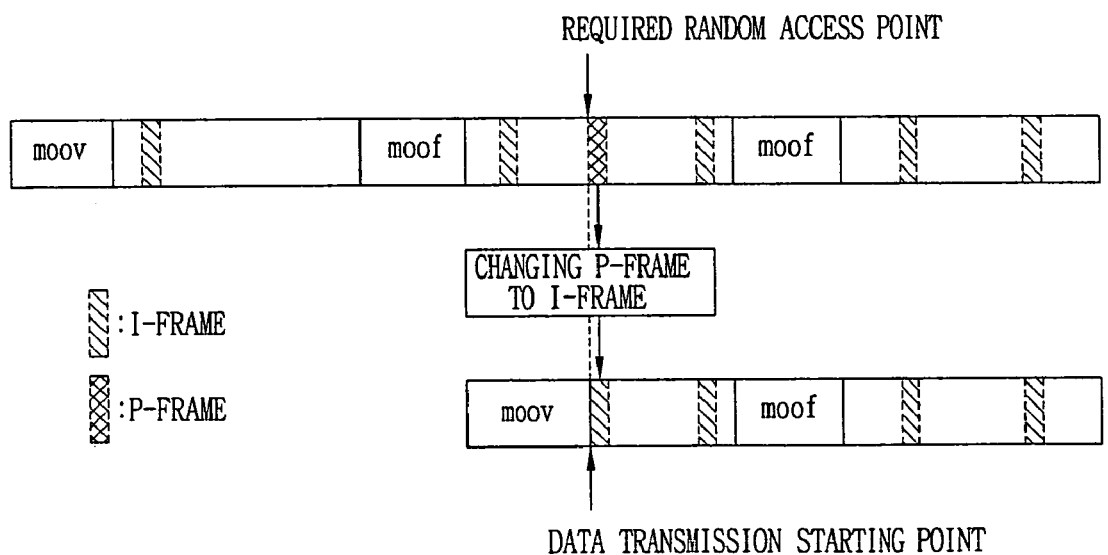
FIG. 7 is a block diagram showing a second embodiment of the present invention applied by the HTTP based video streaming method in a mobile communication system.

FIG. 5 is a flow chart illustrating the HTTP based video streaming method of the mobile communication system according to a preferred embodiment of the present invention, and FIGS. 6 and 7 are block diagrams illustrating first and second embodiments applying the HTTP based video streaming method.

Referring to FIGS. 5, 6, and 7, the HTTP based video streaming method of the mobile communication system according to preferred embodiments of the present invention will be further described.

When a random access request is inputted by the user (step S11), the random access searching unit 22 searches the content files stored in the memory 21 (step S12) to decide whether or not the requested random access point exists in the content files stored in the memory 21 (step S13).

If the random access point exists in the memory 21, the files are decoded from that point and are displayed so that the user can view it (step S14).

If, on the other hand, the random access point does not exist in the memory 21, the random access searching unit 22 transmits a random access request message to the transmitting server 20, including information about the corresponding random access point.

The transmitting server 20 receives the random access request message, and searches for the random access point in the content files stored therein (step S15). The transmitting server 20 next determines whether or not the screen type of the searched random access point is an I-frame (step S16). At that time, the content files stored in the transmitting server 20 are preferably data stream configurations of the MP4 files applied by the file fragmentation process.

If it is determined that the type of the random access point is an I-frame, the media data sample including the corresponding I-frame is set (step S17). Then, the I-frame is determined to be the data transmission starting point and the data stream corresponding to the user request is configured using the new media data sample including the I-frame and the next media samples (step S18).

Since the media data sample including the I-frame is the first packet transmitted by the random access request and the original representative header should be discarded, the segment header of the media data sample is converted into the representative header (step S19). At that time, the segment header is preferably converted into the new representative header by receiving information commonly corresponding to the respective media data samples from the original representative header.

The files are transmitted to the memory 21 of the receiving party starting from the random accessed point requested by the user (step S20).

When the type of the random access point is not the I-frame, the transmitting server 20 determines whether or not the user wants to receive the data from an exact random access point (step S21). If the user does not require the exact random access point, the transmitting server 20 detects an I-frame closest to the requested random access point (step S22), and then designates the media data sample including the I-frame (step S17).

The I-frame is thus set as the data transmission starting point and the data stream corresponding to the user request is configured using the new media data sample including the I-frame and the next media samples (step S18). Then, the segment header of the media data sample including the I-frame is converted into the representative header (step S19), and the data is transmitted to the memory 21 of the receiving party (step S20).

If the type of the random access point is a P-frame, and if the data must be transmitted from the exact random access point, then the media data sample including the P-frame is found (step S23). The P-frame is then converted into an I-frame, and the new media data sample is configured based on the I-frame (step S24).

Specifically, the P-frame is converted into the I-frame using the fact that the general video bit stream comprises an I-frame (the reference frame) and a P-frame representing a difference from the I-frame or the previous frame.

Thus, in order to convert the P-frame into the I-frame, the I-frame most similar to the P-frame is searched, and a value of the P-frame next to the I-frame is calculated with the I-frame to convert that P-frame into an I-frame. Then, the P-frame next to the newly converted I-frame is calculated with the converted I-frame to be converted into another new I-frame.

The above process is repeatedly performed until the P-frame corresponding to the random access point is reached, and the desired P-frame can therefore be converted into an I-frame.

FIG. 6 illustrates a first embodiment of the present invention illustrating a method for configuring the data stream for the random access using the I-frame at the random access point requested by the user, or using the I-frame closest to the requested random access point. As shown therein, the I-frame is determined to be the data transmission starting point, and the segment header of the media data sample, including the I-frame, is converted into the representative header.

FIG. 7 illustrates a second embodiment of the present invention illustrating a method for configuring the data stream when the request random access point is a P-frame, and the exact random access point is required. As shown therein, the P-frame is converted into an I-frame and the converted I-frame is determined to be the data transmission starting point to configure the new data stream.

As described above, the preferred embodiments of the HTTP based video streaming apparatus and method of the mobile communication system has various advantages. For example, providing random access required by a user can be supported regardless of the environmental conditions and regardless of what is already in memory.

In addition, the random access service can be supported from the desired point when the user requires the streaming first, and the random access can be supported even when the part required by the user has not been stored in memory.

Also, various services can be provided according to the accuracy of the random access required by the user. For example, exact access to a P-frame can be provided.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A Hypertext Transfer Protocol (HTTP) based video streaming method of a mobile communication system, the method comprising:
   receiving, by a transmitting server, information of a specific random access point from a remote unit, the specific random access point being input by a user at the remote unit;
   searching for the specific random access point in a content file stored in the transmitting server in response to the transmitting server receiving the information of the specific random access point input by the user at the remote unit;
   reconfiguring a data stream based on a screen type of the specific random access point input by the user and a coincidence between the specific random access point and a data transmission starting point, wherein reconfiguring the data stream comprises:
      determining an existing I-frame that is most similar to the specific random access point when the specific random access point is determined to be a P-frame and is the data transmission starting point,
      converting the P-frame into a new I-frame based on values of the existing I-frame and a next P-frame, wherein the converting is performed until the next P-frame is the specific random access point,
      configuring a media data sample based on the new I-frame as the data transmission starting point,
      configuring a new data stream using the media data sample and continuous media data samples,
      converting a segment header of the media data sample having the new I-frame into a representative header, and
      discarding frames between the converted representative header and the header of the new I-frame in the media data sample; and
   transmitting the new data stream including the converted representative header from the transmitting server to the remote unit.

2. The method of claim 1, wherein the content file in the transmitting server is an MP4 file applied by a file fragmentation process, and the data stream includes a plurality of media data samples and a plurality of headers of the respective media data samples.

3. The method of claim 2, wherein the plurality of headers comprises:
   the representative header including common meta information of the respective media data samples and time information of a first media data sample; and
   at least one segment header including time information of the respective media data samples except the first media data sample.

4. The method of claim 1, wherein the screen type comprises one of an I-frame and a P-frame.

5. The method of claim 1, wherein the representative header comprises meta information that is common for the media data samples.

6. A Hypertext Transfer Protocol (HTTP) based video streaming method in a random access method of a data stream including a plurality of headers and a plurality of media data samples and time information for the media data samples, the method comprising:
   receiving information of a specific random access point that was input by a user;
   determining a P-frame associated with the specific random access point input by the user;
   determining an I-frame that is most similar to the determined P-frame;
   converting a next P-frame that is adjacent to the determined I-frame into a new I-frame based on information of the next P-frame and the I-frame;
   configuring a media data sample by setting the converted new I-frame as a data transmission starting point after the converting into the new I-frame;
   converting a segment header of the configured media data sample having the converted new I-frame into a representative header which is other than a header of the converted new I-frame;
   discarding frames between the converted representative header and the header of the new I-frame in the media data sample; and
   transmitting a data stream having the converted header and the configured media data samples.

7. The method of claim 6, wherein converting the header comprises transmitting meta information of respective media data stored in the first header before converting the header.

* * * * *